(12) United States Patent
Shotey et al.

(10) Patent No.: US 8,250,773 B1
(45) Date of Patent: Aug. 28, 2012

(54) ADJUSTABLE DEVICE ALIGNMENT TOOL

(75) Inventors: Marcus J. Shotey, Scottsdale, AZ (US);
Jeffrey P. Baldwin, Phoenix, AZ (US);
John Klein, Gilbert, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/966,304

(22) Filed: Dec. 13, 2010

(51) Int. Cl.
*G01B 1/00* (2006.01)
(52) U.S. Cl. ...................................... 33/528; 33/DIG. 10
(58) Field of Classification Search .................... 33/528, 33/613, 645, DIG. 10, 562, 563
See application file for complete search history.

(56) References Cited

U.S. PATENT DOCUMENTS

| | | | |
|---|---|---|---|
| 2,733,513 A * | 2/1956 | Gatineau | 33/528 |
| 4,793,069 A * | 12/1988 | McDowell | 33/528 |
| 5,012,043 A | 4/1991 | Seymour | |
| 5,813,130 A * | 9/1998 | MacDowell | 33/528 |
| 6,209,214 B1 * | 4/2001 | Talavera | 33/528 |
| 6,223,445 B1 * | 5/2001 | Schuette et al. | 33/528 |
| 7,312,395 B1 | 12/2007 | Gretz | |
| 7,531,743 B2 | 5/2009 | Johnson et al. | |
| 7,544,889 B1 | 6/2009 | Sanchez | |
| 7,582,827 B1 | 9/2009 | Gretz | |
| 7,845,089 B1 * | 12/2010 | Lavalle | 33/528 |
| 2004/0083617 A1 * | 5/2004 | Bielen | 33/528 |
| 2008/0022543 A1 * | 1/2008 | Kesler | 33/645 |
| 2010/0095543 A1 * | 4/2010 | Inthavong | 33/528 |
| 2010/0126031 A1 * | 5/2010 | Crorey | 33/528 |

* cited by examiner

*Primary Examiner* — G. Bradley Bennett
(74) *Attorney, Agent, or Firm* — Booth Udall, PLC (57) ABSTRACT

A device for aligning an electrical device including a body having a front surface and a device through hole complimentary shaped to an electrical device perimeter and wherein the device through hole comprises at least two screw holes aligned with screws on the electrical device and the electrical device moves with the through hole to align the electrical device.

20 Claims, 13 Drawing Sheets

ADJUSTABLE DEVICE ALIGNMENT TOOL

BACKGROUND

1. Technical Field

Aspects of this document relate generally to tools and specifically to tools for aligning electrical devices within electrical boxes.

2. Background Art

Electrical devices must be precisely aligned to insure that they protrude precisely through the openings in a wall plate. The alignment process can be cumbersome because the only way to align the device is trial and error. The installer positions and secures the electrical device in the electrical box and then test fits a wall plate. If the installer is lucky, he or she is finished. If not, the installer must then remove the wall plate and attempt to adjust the device and then refit the wall plate.

The advent of depth adjustable electrical devices has added another element of alignment in that the electrical device can now be adjusted in another dimension, into and out of the electrical box. The ultimate goal is to have the electrical device face even with the wall plate or protruding just slightly. Once again, the installer must repeatedly test fit the wall plate and adjust the electrical device to fine tune the installation.

SUMMARY

Aspects of this document relate to electrical device alignment tools. In one aspect, a device for aligning an electrical device includes a body having a front surface and a device through hole complimentary shaped to an electrical device perimeter; and wherein the device through hole comprises at least two screw holes aligned with screws on the electrical device and the electrical device moves with the through hole to align the electrical device.

Particular implementations may comprise one or more of the following features. The device through hole may comprise four screw holes. The front surface may be flat and a reference point for adjusting a depth of the electrical device. The device through hole screw holes may be a pair of device mounting holes. The pair of device mounting holes may be connected to the device through hole. The device through hole and the at least two screw holes may be connected. The electrical device may be movable in a direction perpendicular to the front surface. The at least two screw holes may be accessible from the front surface.

The body may include a leveling apparatus. The leveling apparatus may be located on the front surface. The leveling apparatus may be a bubble level. The body may include a rear surface for contacting a reference surface. The reference surface may be a wall front surface. The body may include a thickness approximately equal to a wall plate thickness. The body may include a thickness of approximately one quarter of an inch.

In another aspect, a method of aligning an electrical device comprises the steps of providing an alignment device having a body with a device through hole and a front surface, installing an electrical device having an outer surface within an electrical box, locating the alignment device around the electrical device, and adjusting the electrical device so that the electrical device outer surface is coplanar with the alignment device outer surface.

Particular implementations may comprise one or more of the following features. The method may include the steps of removing the alignment device and installing a wall plate around the electrical device. The method may include the step of positioning the alignment device with a leveling apparatus before adjusting the electrical device. The step of adjusting the electrical device may include the step of adjusting the electrical device through the device through hole. The step of locating the alignment device around the electrical device includes positioning the alignment device abutting a wall front surface.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an alignment tool will become apparent for use with implementations of an alignment tool from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an alignment tool.

Figure 1:
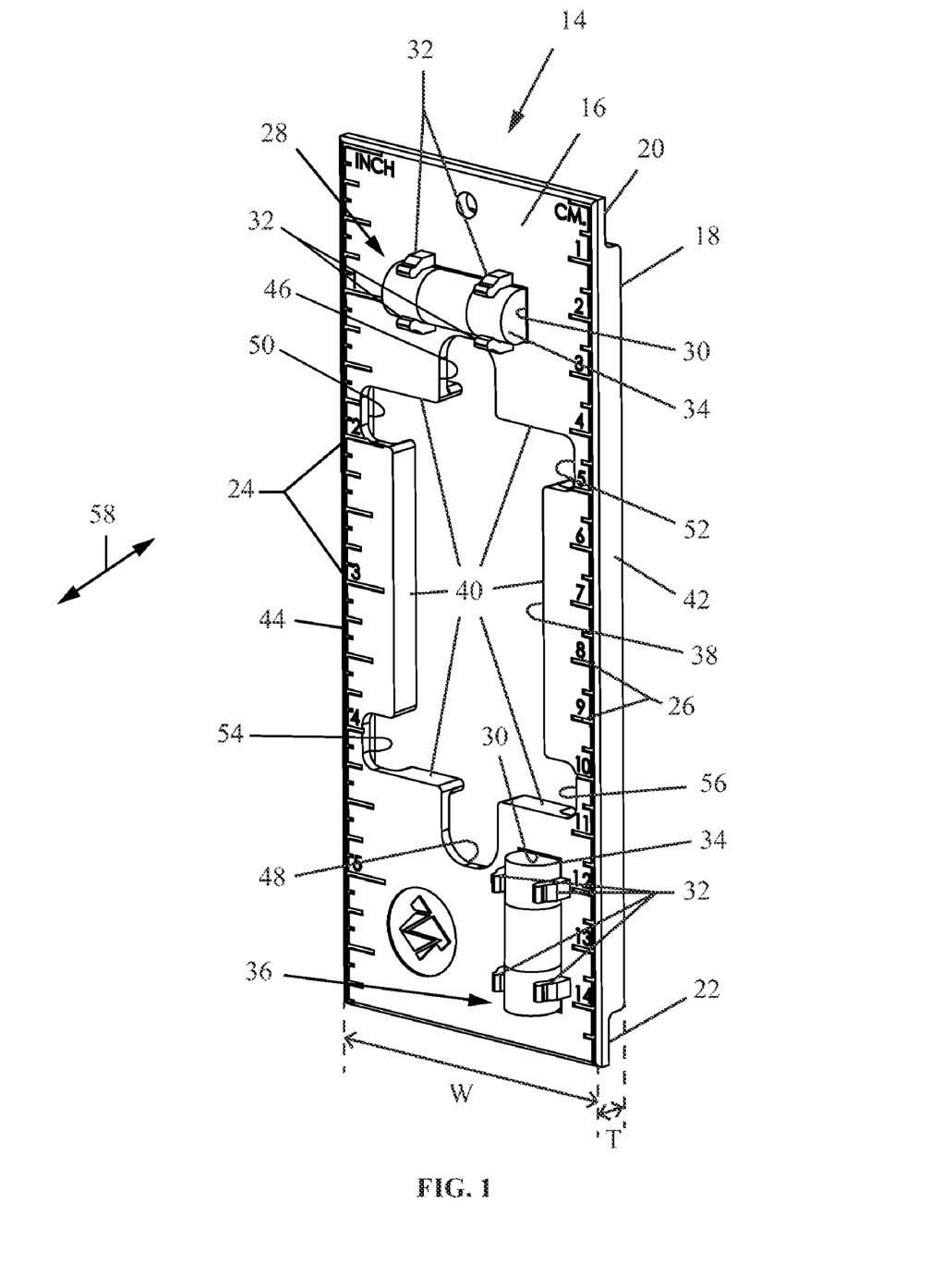
FIG. 1 is a perspective view of a device for aligning an electrical device.

FIGS. 1 though 5 illustrate an alignment device 14 having a front surface 16 and a rear surface 18 with a thickness T separating the front and rear surfaces. Rear surface 18 includes a top finger grip 20 and a bottom finger grip 22. Front surface 16 may include an English measuring system 24 and/or a metric measuring system 26 thereon. Further, alignment device 14 may include a vertical leveling apparatus 28 consisting of a recess 30 in alignment device 14, a plurality of arms 32, and a bubble level 34. A horizontal leveling apparatus 36 includes a similar recess, arms, and bubble level, but each arranged perpendicular to the vertical leveling apparatus. Both the vertical and horizontal leveling apparatuses use removable bubble levels 34 in one implementation, however any suitable leveling device may be used without departing from the spirit and scope of the disclosure.

Alignment device 14 includes a through hole 38 generally centrally located within the alignment device and extending through the front and rear surfaces. Through hole 38 may be generally rectangular in shape and sized to receive a decorator receptacle, a duplex receptacle, a dimmer switch, a Ground Fault Circuit interrupter, a rocker switch, or any other receptacle or switch. The shape and size of through hole 38 is such that the electrical receptacle or electrical switch therein contacts inner perimeter walls 40 on each side and any movement of through hole 38 and adjustment device 14 also moves the electrical receptacle or electrical switch when the receptacle or switch are not securely fastened to the electrical box. In addition, the alignment device includes a width W with a right side 42 and a left side 44. Width W is dimensioned in combination with right side 42 and left side 44 such that right side 42 contacts an electrical device or switch adjacent the electrical device within through hole 38, while left side 44 contacts another electrical device or switch on the other side of the centrally located electrical device.

Figure 2:
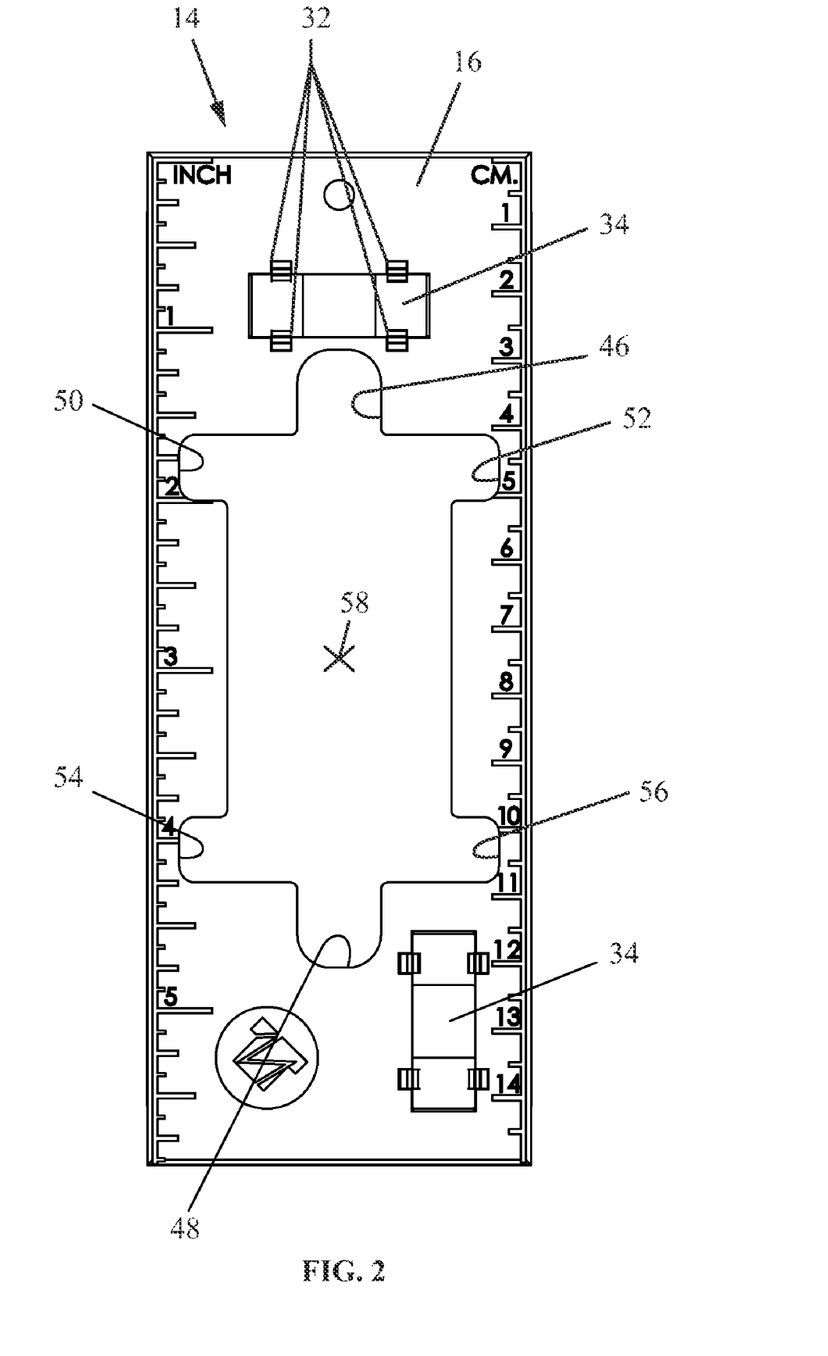
FIG. 2 is a front elevation view of a device for aligning an electrical device with six screw holes.
Figure 3:
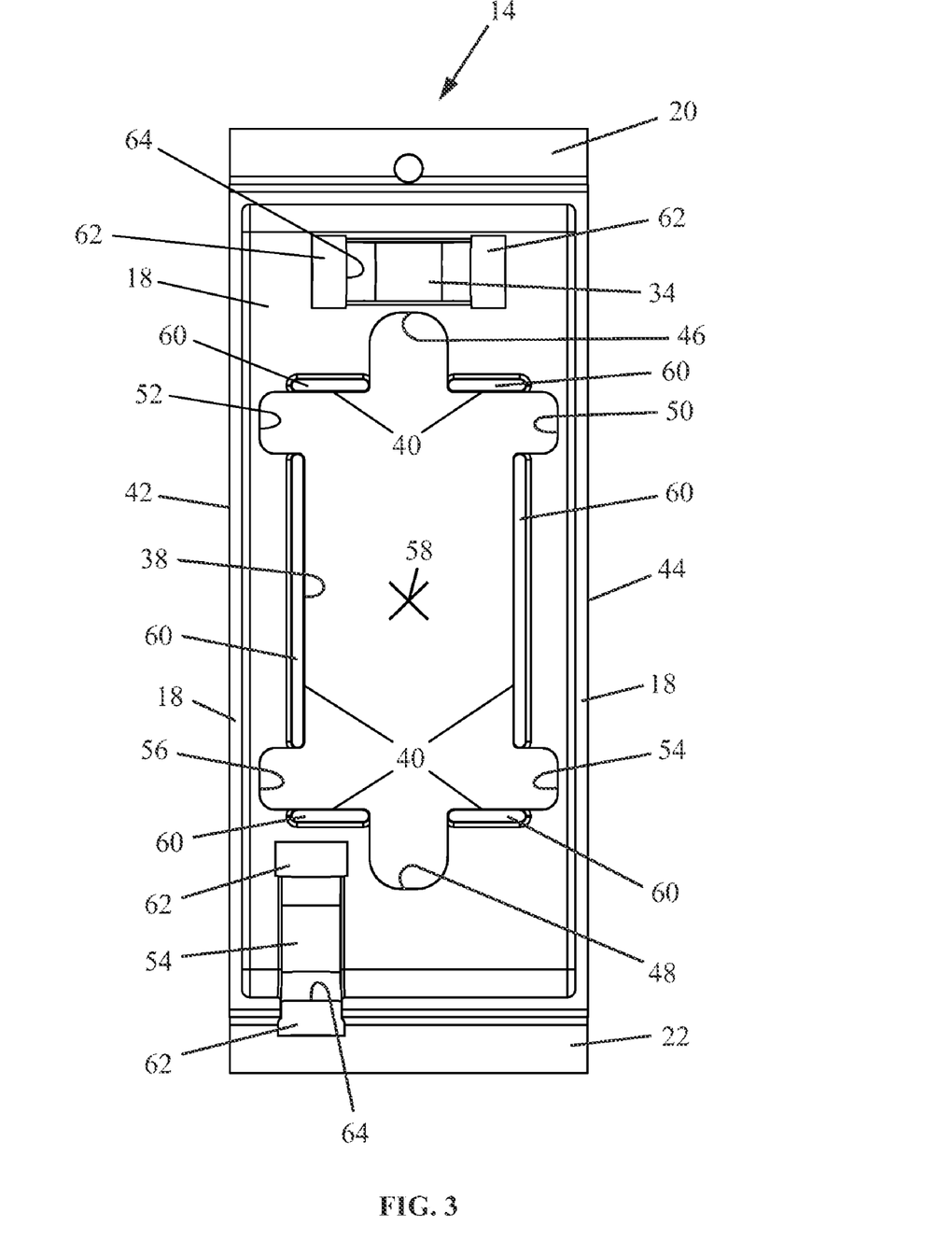
FIG. 3 is a rear elevation view of a device for aligning an electrical device with six screw holes.

A plurality of screw holes 46 through 56 extend through front surface 16 and rear surface 18. Screw holes 46 and 48 are located at the top and bottom, respectively, of through hole 38 and are aligned with the mounting screws of an electrical device (not shown) known in the art. Particularly, screw holes 46 and 48 are common on almost all electrical receptacles and switches and provide a fairly limited amount of mounting play. Nevertheless, electrical devices with only two mounting screws can be improperly aligned and are particularly noticeable when multiple devices are located in a row.

Screw holes 50, 52, 54, and 56 are located at the top left, top right, bottom left, and bottom right, respectively, of through hole 38. Each of screw holes 50-56 may be used in conjunction with an adjustable electrical device that permits movement into and out of through hole 38, namely in the direction of arrows 58. Further, screw holes 46 through 58 may each be located adjacent through hole 38 and may also be connected to or formed with through hole 38.

In many adjustable electrical devices, only two adjustment screws are necessary in addition to the two device mounting screws. In that case, opposing corners, top left and bottom right or top right and bottom left will be utilized together to reduce the number of additional components. Thus, by providing four screw holes 50-56, regardless of the adjustment screw locations, the user can easily and efficiently access the adjustment screws.

Figure 4:
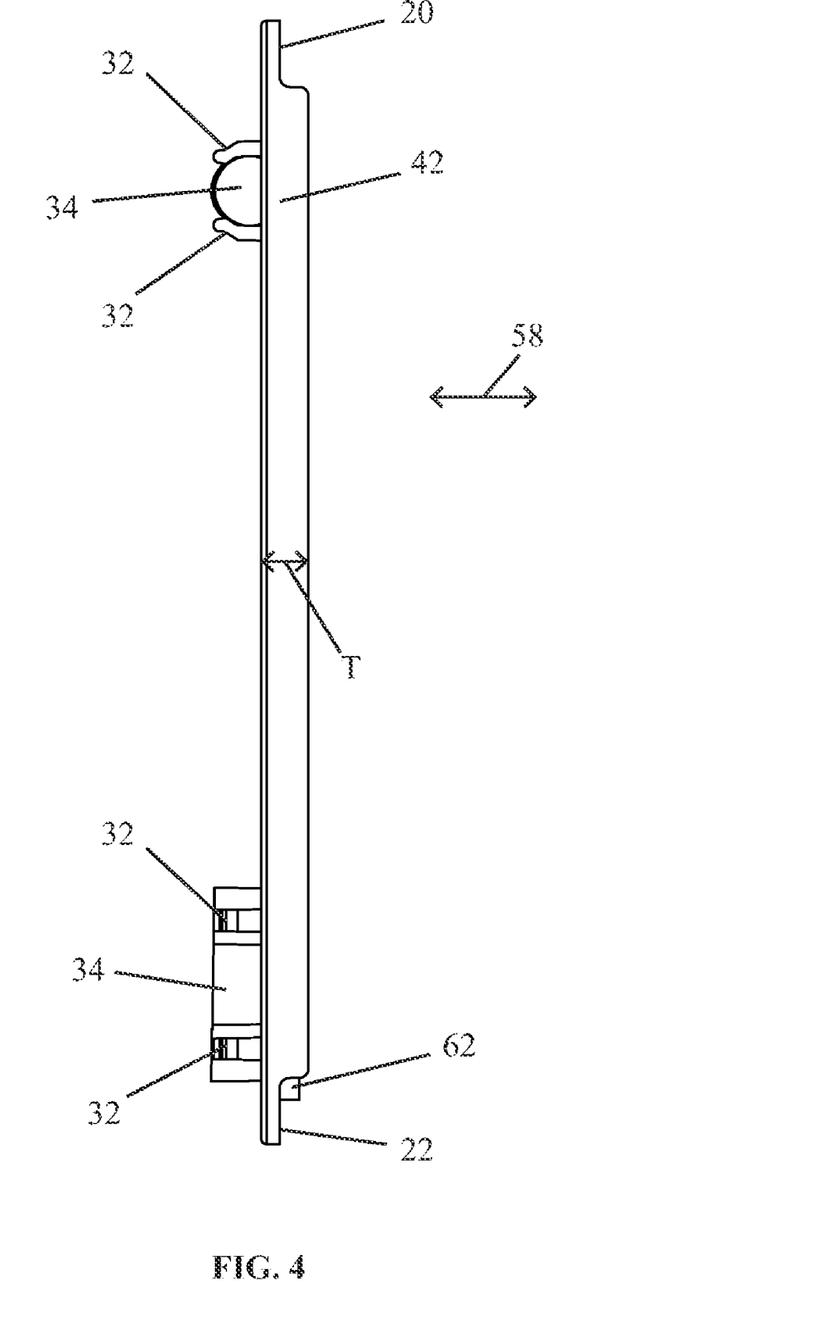
FIG. 4 is a right side elevation view of a device for aligning an electrical device.
Figure 5:
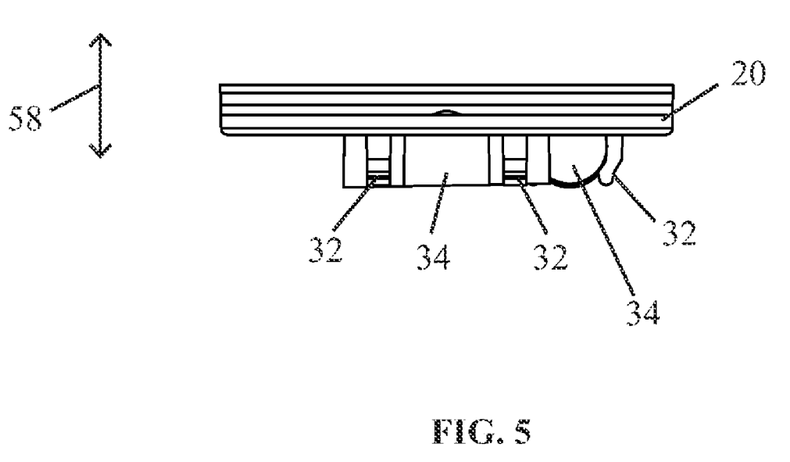
FIG. 5 is a top plan view of a device for aligning an electrical device.

Referring specifically to FIGS. 3 and 4, which are a rear elevation view and a right side elevation view of device alignment tool 14. Top and bottom finger grips 20 and 22 are each offset from rear surface 18 and provide a location for a user to insert his or her fingers during the alignment process. The finger grips permit the operator to precisely hold the alignment tool while still permitting controlled movement in any direction to assist in the final alignment position. Further, the finger grips permit the user to remove the device from around an electrical device in a simple and efficient manner by pulling alignment tool 14 forward at either or both of finger grips 20 and 22. While finger grips 20 and 22 are shown in each of the views, the finger grips are not seen as an essential element of the disclosure and are merely included to assist the user in manipulating the alignment tool.

Rear surface 18 also includes a plurality of tabs 60 surrounding through hole 38 and include inner perimeter walls 40. Tabs 60 preferably extend downward from rear surface 18 approximately the same length as a traditional wall plate or one-fourth of an inch. The height of tabs 60 is important because they serve as a reference point for the alignment device. Specifically, tabs 60 rest against the front of the electrical box or the wall when the to-be-aligned electrical device is located within through hole 38. When the tabs are resting against the electrical box or the wall, the distance between front surface 16 and the bottom of tabs 60 is approximately equal to the thickness of a standard wall plate, which in turn permits the user to precisely control how far beyond the wall plate the electrical device will stick without repeatedly test fitting and readjusting the electrical device. Thus, the alignment tool saves a considerable amount of installation time.

Rear surface 18 also includes a pair of cradles 62 with one of each of the cradles on a side of recess 30. Cradles 62 are generally concave in shape with the curved surface complimentary shaped to bubble level 34. Advantageously, an opening 64 is located between each pair of cradles 62 and permits light to pass there through to ease viewing bubble level 34 while the user is operating the alignment tool.

Figure 6:
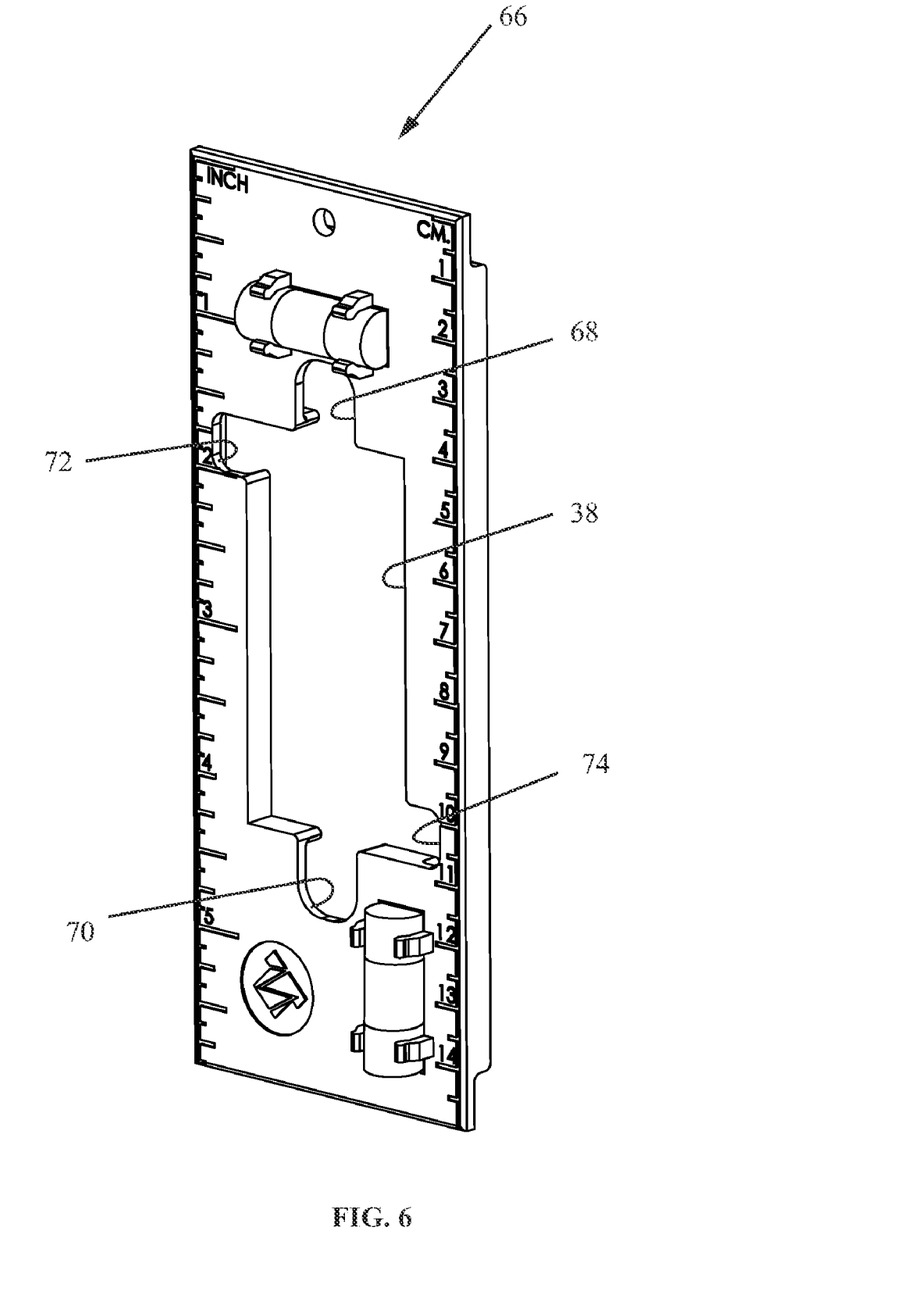
FIG. 6 is a perspective view of a second aspect device for aligning an electrical device with four screw holes.

FIG. 6 illustrates a second aspect alignment device 66 having identical features as alignment device 14 except for a different number of screw holes 68 through 74 surrounding and connected to through hole 38. Specifically, alignment device 66 is arranged with a top screw hole 68, a bottom screw hole 70, a top left adjustment hole 72 and a bottom right adjustment hole 74. The remainder of the alignment device is similar, including both horizontal and vertical leveling apparatuses, and finger grips. Accordingly, alignment device 66 is useful for adjusting the vertical, horizontal, and depth of an electrical device located within through hole 38 that also includes mounting screws aligned with top screw hole 68, bottom screw hole 70, and depth adjustment screws aligned with top left screw hole 72 and bottom right screw hole 74.

Figure 7:
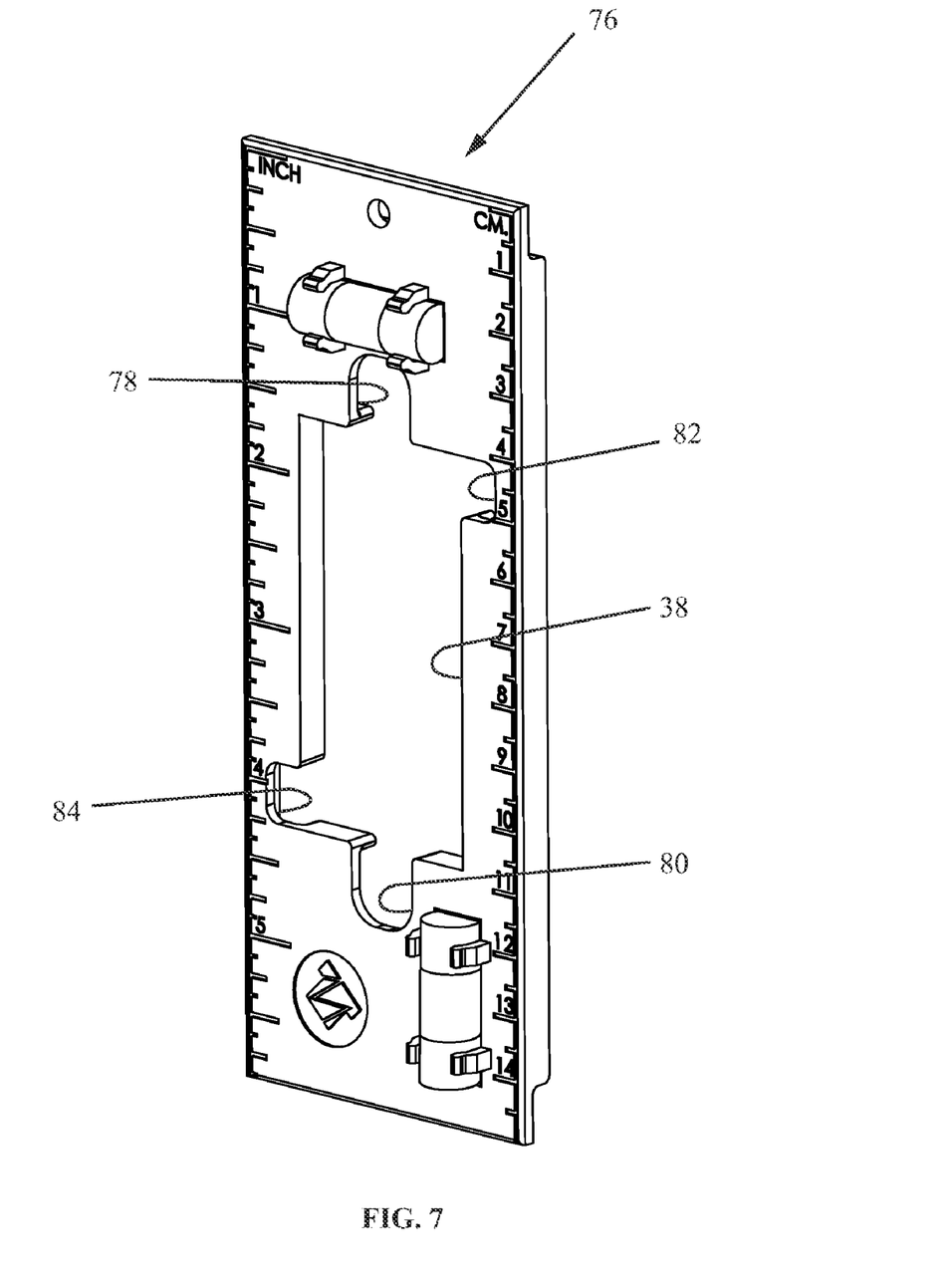
FIG. 7 is a perspective view of a third aspect device for aligning an electrical device with four screw holes.

FIG. 7 illustrates a third aspect alignment device 76 having identical features as alignment devices 14 and 66 except for a different screw hole arrangement than alignment device 66. Alignment device 76 includes a top screw hole 78, a bottom screw hole 80, a top right screw hole 82, and a bottom left screw hole 84. Alignment device 76 functions identical to alignment device 66 except that alignment device 76 is particularly useful for an electrical device having adjustment screws in the top right and lower left corners. Functionally, alignment device 76 performs in the same manner by providing the user with smooth adjustment in the vertical, horizontal, and depth of an electrical device.

Figure 8:
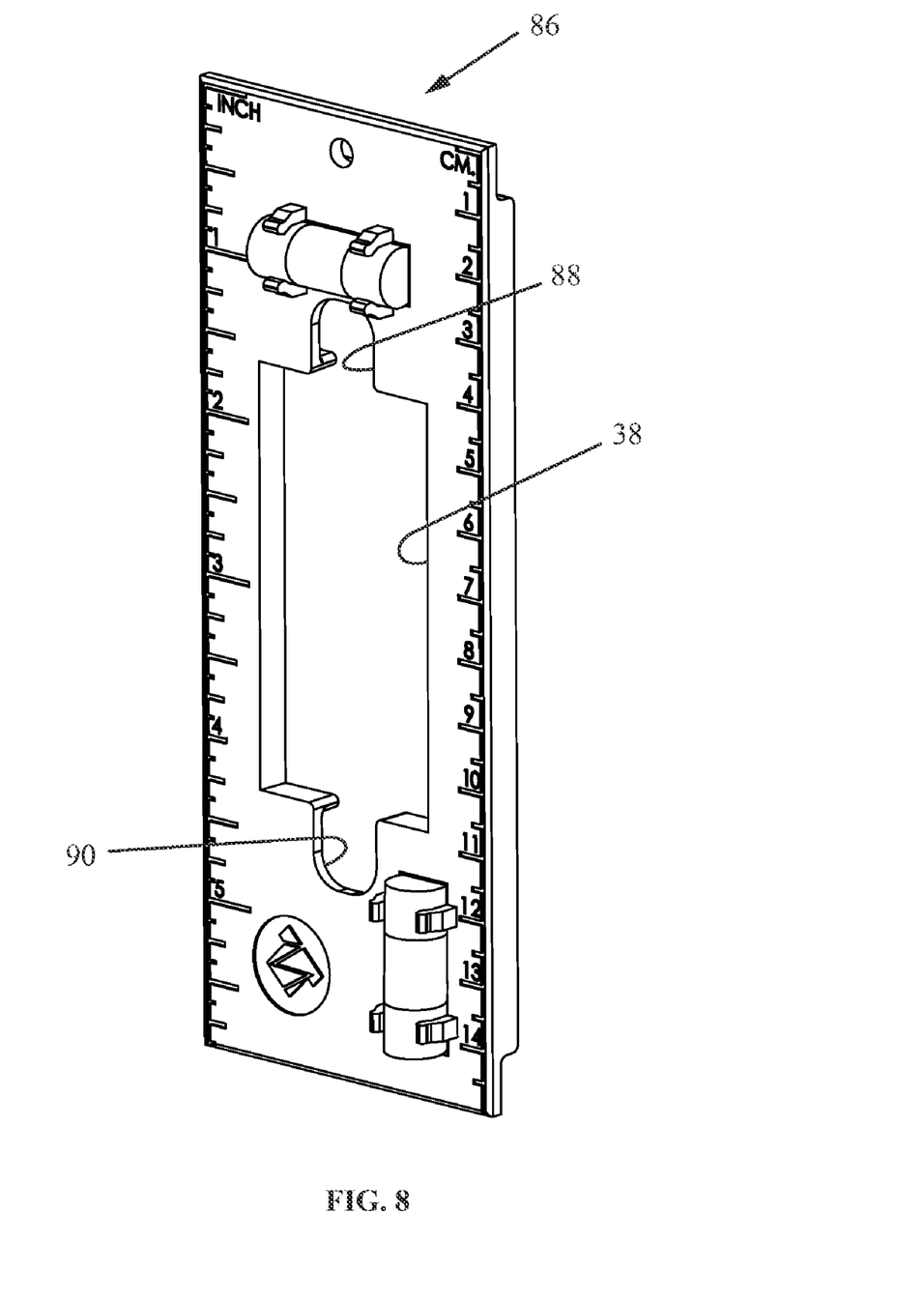
FIG. 8 is a perspective view of a fourth aspect device for aligning an electrical device with two screw holes.

FIG. 8 illustrates a fourth aspect alignment device 86 with only a top screw hole 88 and a bottom screw hole 90 connected to and adjacent through hole 38. Most notably, alignment device 86 includes only top screw hole 88 and bottom screw hole 90 for device mounting screws. Thus, any electrical device within through hole 38 will only be adjustable in the vertical or horizontal directions and will not be depth adjustable. Alignment device 86 is particularly useful for standard electrical devices that are not depth adjustable.

Figure 9:
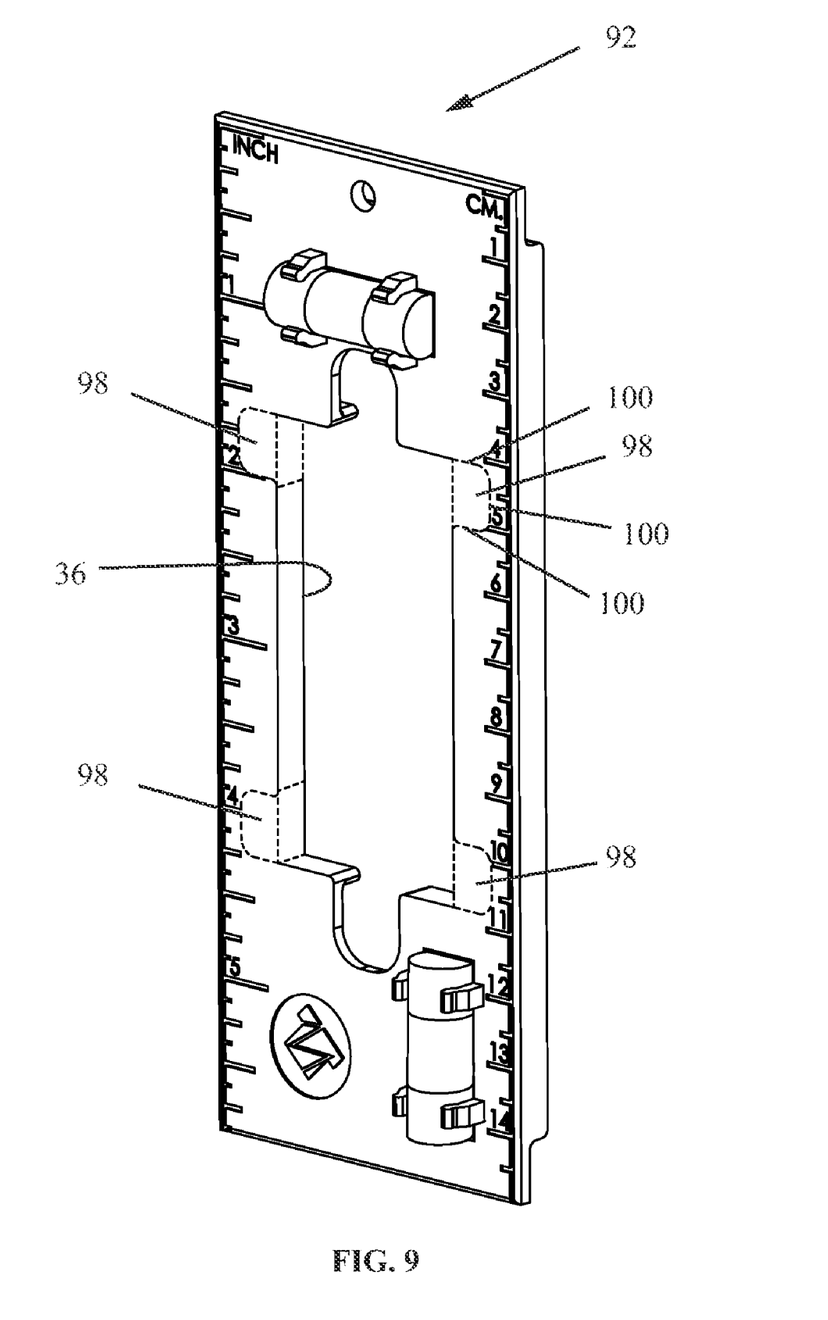
FIG. 9 is a perspective view of a fifth aspect device for aligning an electrical device with four removable screw holes.

FIG. 9 illustrates a fifth aspect alignment device 92 having through hole 36, top screw hole 94, bottom screw hole 96, and a plurality of removable screw hole members 98 preferably located at the top left, top right, bottom right, and bottom left of through hole 36. Members 98 are more easily removed by being perforated as indicated by dashed lines 100 on three sides. The user can then permanently remove the desired screw hole member 98 along the perforations and provide adjustability to the particular device needed. For example, if a traditional non-depth adjustable device were being aligned, the user could keep all four screw hole member 98 in place and perform the vertical and/or horizontal alignment. However, if the electrical device is depth adjustable and includes adjustment screws in the top right and bottom left, the user can easily remove the appropriate screw hole members and proceed with aligning the electrical device. Although the screw hole members cannot be reinstalled in one aspect, the user can continue to operate the alignment device as normal. In another aspect, not shown, the screw hole members 98 pivot outward to expose the screws holes and after operation they may be pivoted back into their locked position.

Figure 10:
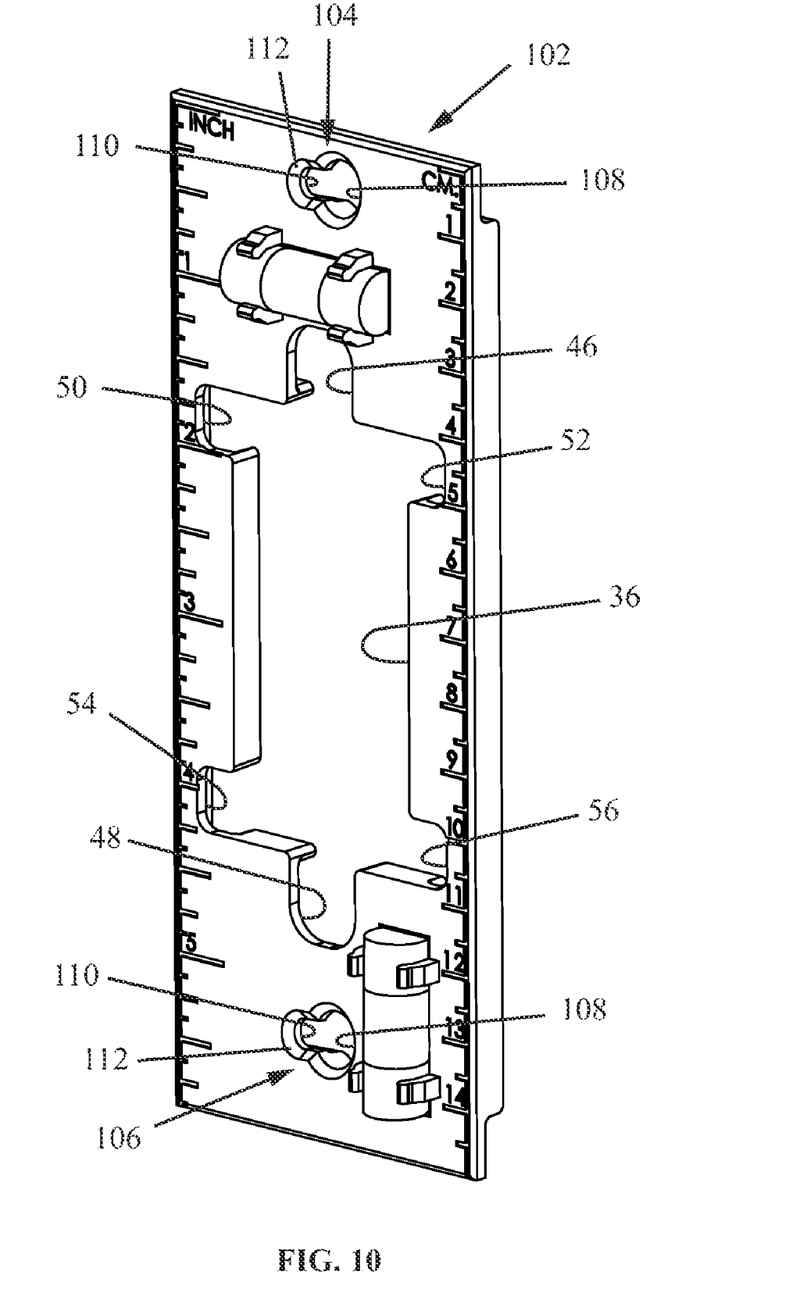
FIG. 10 is a perspective view of a device for aligning an electrical device with keyhole mounting apertures.

FIG. 10 illustrates a sixth aspect alignment device 102 having an upper keyhole alignment opening 104 and a lower keyhole alignment opening 106. Both upper and lower keyhole alignment openings include a mounting aperture 108 and a locking aperture 110 adjacent one another. Both mounting aperture 108 and locking aperture 110 include a beveled edge 112 extending around the perimeter for securing a mounting screw. Advantageously, the user located a wall plate mounting screw within the electrical box aperture and mounts the adjustment device so that the wall plate mounting screw is inserted through mounting aperture 108. The user can then slide the adjustment device to the right to locate the wall plate mounting screw within the locking aperture 110. Once the alignment device is properly aligned, the user can tighten the wall plate mounting screw within locking aperture 110 and prevent alignment device 102 from moving. The user can then align the electrical device using top and bottom screw holes 46 and 48 or using screw holes 50-56 to access any applicable depth adjustment screws. Having properly aligned the electrical device, the user can then unscrew the wall plate mounting screw and remove alignment device 102.

Figure 11:
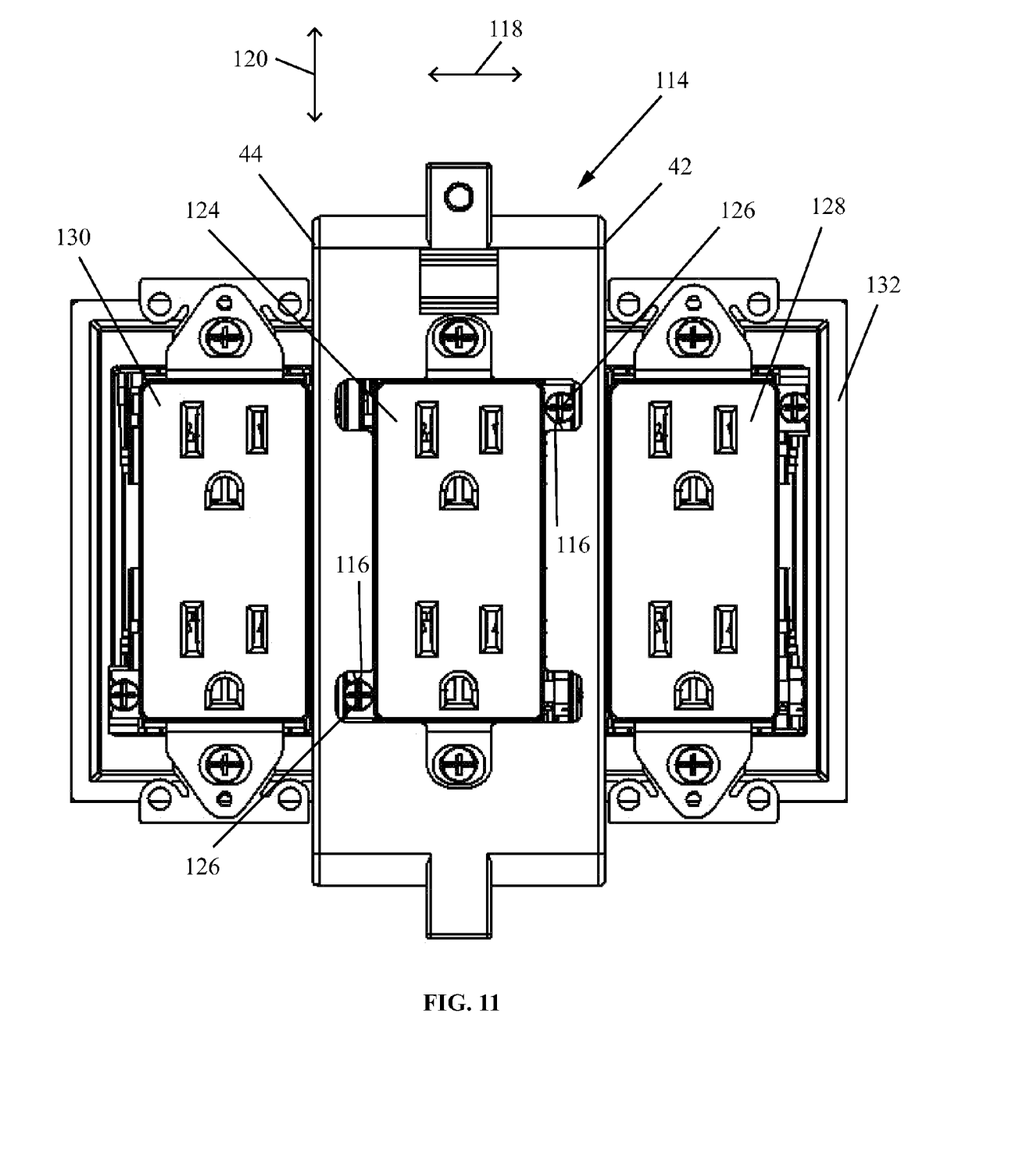
FIG. 11 is a front elevation view of a device for aligning an electrical device located around the electrical device and two additional electrical devices adjacent the alignment device.
Figure 12:
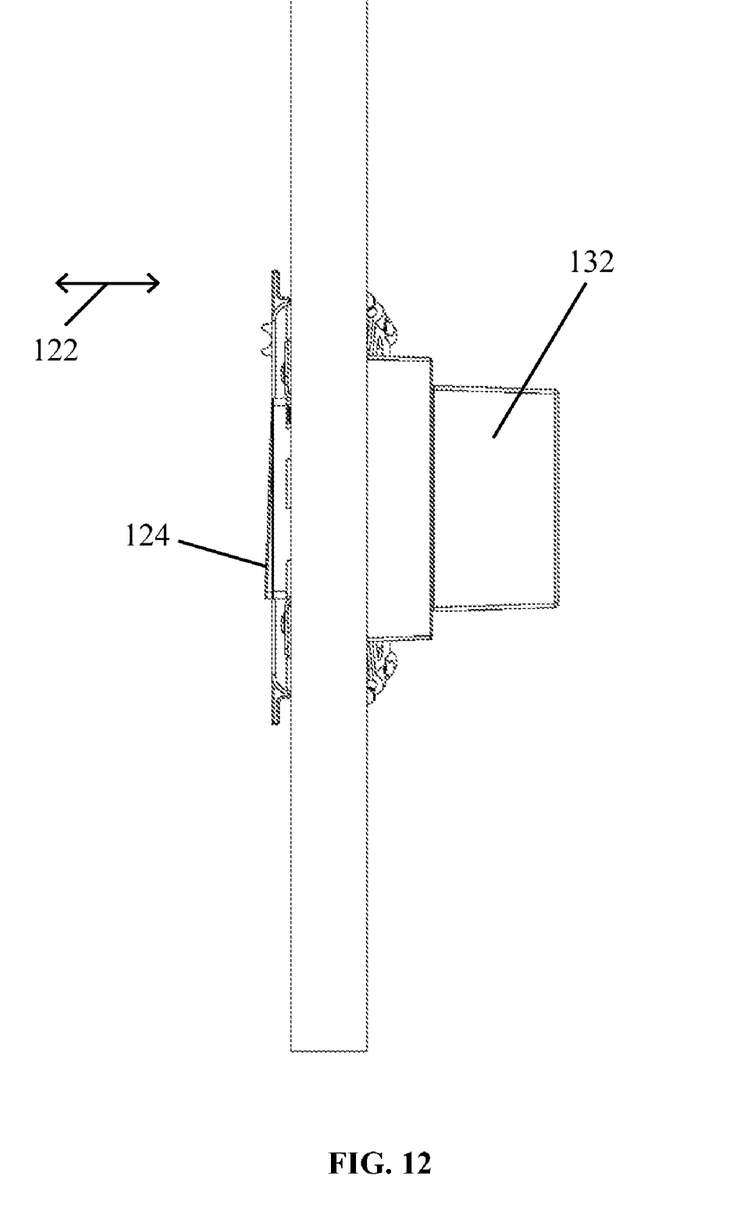
FIG. 12 is a right elevation view of an electrical device incorrectly mounted within an electrical box and a device for aligning the electrical device located around the electrical device; and, FIG. 13 is a right side elevation view of the electrical device of FIG. 12 correctly mounted after using the device for adjusting electrical devices.
Figure 13:
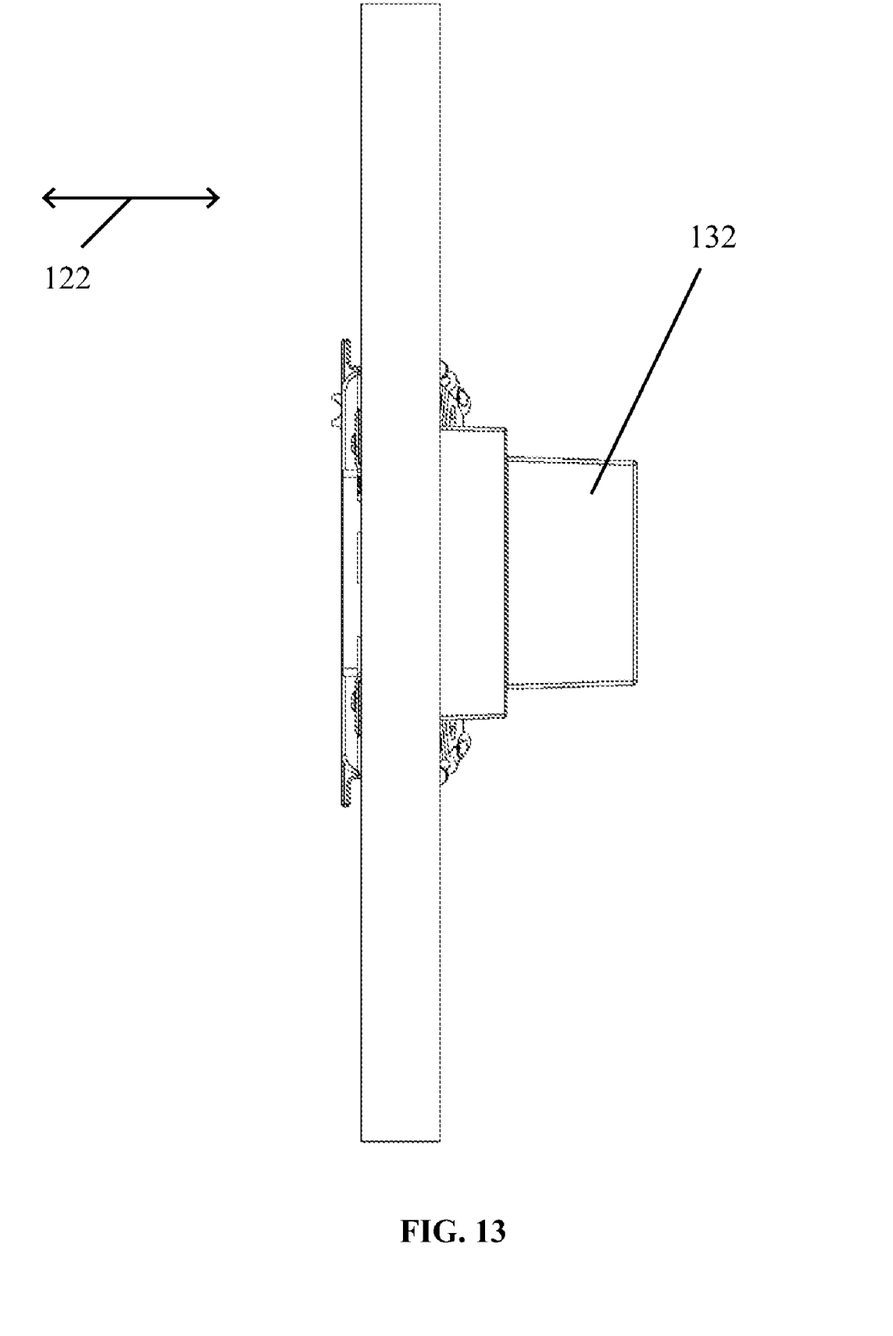

FIGS. 11 through 13 illustrate an alignment device 114 with four screw hole openings 116 similar to the previous aspects. While alignment device 114 is shown as being slightly different than previous aspects, any previously disclosed alignment device may be utilized to provide precise alignment in any directions, including horizontally as indicated by arrows 118, vertically as indicated by arrow 120, or depth as indicated by arrows 122. As particularly shown in FIG. 11, screw hole openings 116 permit access to electrical device 124 and depth adjustment screws 126. Further, right side 42 abuts an adjacent electrical device 128, while left side 44 abuts an adjacent electrical device 130. Thus, any movement of alignment device 114 also provides movement of adjacent electrical devices 128 and 130. The user can therefore provide horizontal alignment of three electrical devices at one time if adjacent electrical devices remain in contact with the alignment device.

FIG. 12 illustrates electrical device 124 misaligned within electrical box 132. Specifically, the bottom of the electrical device is extended away from electrical box 132 a greater distance than the top of the electrical device. The user must then operate one of the adjustment screws, the lower left adjustment screw shown in FIG. 11 to move the bottom of the electrical device inward, or the top right adjustment screw to move the top of the electrical device outward. Regardless of which adjustment screw is operated, the ultimate goal is to have the front face of the electrical device parallel to the front surface of the alignment tool and extending at least beyond the front surface of a wall plate. Thus, it is advantageous to adjust the electrical device outward sufficiently beyond the front surface of the alignment device. As can be seen in FIG. 13, the electrical device has been adjusted outwards to be even with the front surface of the alignment device and is now ready to receive a wall plate without requiring further alignment of the electrical device.

In operation, an electrical device is loosely installed within the electrical box to permit limited movement and an alignment device is located around the electrical device so that the electrical device is located within through hole 38. The user can then adjust the alignment device, the electrical device moving with the alignment device, until the bubble level reads that the alignment device is perfectly aligned. The user can then tighten the device mounting screws to lock the electrical device from moving vertically or horizontally. Next, the user can manipulate depth adjustment screws through screw holes in the alignment device to locate the electrical device even with the front surface of the alignment device or coplanar. Once the electrical device is properly aligned, the alignment device may be removed and a traditional wall plate may be installed without requiring the user to install and remove the wall plate while adjusting the electrical device.

Still further, the alignment device can provide a number of other functions, including measuring using English measuring system 24 or metric measuring system 26 and function as a horizontal or vertical torpedo level.

It will be understood that implementations are not limited to the specific components disclosed herein, as virtually any components consistent with the intended operation of a method and/or system implementation for an electrical device alignment tool may be utilized. Components may comprise any shape, size, style, type, model, version, class, grade, measurement, concentration, material, weight, quantity, and/or the like consistent with the intended operation of a method and/or system implementation for an electrical device alignment tool.

The concepts disclosed herein are not limited to the specific implementations shown herein. For example, it is specifically contemplated that the components included in a particular implementation of an electrical device alignment tool may be formed of any of many different types of materials or combinations that can readily be formed into shaped objects and that are consistent with the intended operation of an electrical device alignment tool. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical device alignment may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical device alignment tool, it should be readily apparent that a number of modifications may be made without departing from the spirit thereof and that these implementations may be applied to other electrical device alignment tools. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A device for aligning an electrical device comprising:
   a body having a front surface and a device through hole complimentary shaped to an electrical device perimeter; and,
   wherein the device through hole comprises at least two screw holes aligned with screws on the electrical device and the electrical device moves with the through hole to align the electrical device.

2. The device of claim 1 wherein the device through hole comprises four screw holes.

3. The device of claim 1 wherein the front surface is flat and is a reference point for adjusting a depth of the electrical device.

4. The device of claim 1 wherein the device through hole screw holes are a pair of device mounting holes.

5. The device of claim 4 wherein the pair of device mounting holes are connected to the device through hole.

6. The device of claim 1 wherein the device through hole and the at least two screw holes are connected.

7. The device of claim 1 wherein the body further comprises a leveling apparatus.

8. The device of claim 7 wherein the leveling apparatus is located on the front surface.

9. The device of claim 7 wherein the leveling apparatus is a bubble level.

10. The device of claim 1 wherein the body further comprises a rear surface for contacting a reference surface.

11. The device of claim 1 wherein the body further comprises a thickness approximately equal to a wall plate thickness.

12. The device of claim 11 wherein the body further comprises a thickness of approximately a quarter of an inch.

13. A method of aligning an electrical device with an electrical device box comprising the steps of:
    providing an alignment device having a body with a device through hole and a front surface;
    installing an electrical device having an outer surface within an electrical box;
    locating the alignment device around the electrical device from a front side of the electrical device so that the device through hole is in contact with the outer surface of the electrical device; and,
    adjusting the electrical device by moving the alignment device so that the electrical device outer surface is coplanar with the alignment device outer surface.

14. The method of claim 13 further comprising the steps of:
    removing the alignment device; and,
    installing a wall plate around the electrical device.

15. The method of claim 13 further comprising the step of positioning the alignment device with a leveling apparatus before adjusting the electrical device.

16. The method of claim 13 wherein the step of adjusting the electrical device includes the step of adjusting the electrical device by moving the device through hole.

17. The method of claim 13 wherein the step of locating the alignment device around the electrical device includes positioning the alignment device abutting a wall front surface.

18. The device of claim 9, further comprising a second bubble level located on the front surface.

19. The device of claim 18, further comprising a ruler along an edge of the front surface.

20. The device of claim 1, further comprising at least two removable screw hole members removably positioned within at least two of the at least two screw holes.

* * * * *